US008634819B2

(12) United States Patent  
Mauer et al.

(10) Patent No.: US 8,634,819 B2  
(45) Date of Patent: *Jan. 21, 2014

(54) WIRELESS COMMUNICATIONS DURING A WIRELESS COMMUNICATIONS DEVICE REBOOT

(75) Inventors: Brian D. Mauer, Shawnee, KS (US); Pallavur Sankaranaraynan, Overland Park, KS (US); Matthew C. Schlesener, Shawnee, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,401

(22) Filed: Aug. 8, 2012

(65) Prior Publication Data

US 2013/0003610 A1 Jan. 3, 2013

Related U.S. Application Data

(63) Continuation of application No. 12/582,080, filed on Oct. 20, 2009, now Pat. No. 8,270,962.

(51) Int. Cl.  
*H04M 3/00* (2006.01)  
*H04M 11/04* (2006.01)  
*H04M 1/00* (2006.01)  
*H04B 7/00* (2006.01)  
*G06F 15/16* (2006.01)  
*G06F 9/455* (2006.01)  
*G06F 9/46* (2006.01)

(52) U.S. Cl.  
USPC ..... 455/418; 455/404.1; 455/521; 455/550.1; 709/201; 709/202; 718/1; 718/102; 718/104; 718/105

(58) Field of Classification Search  
USPC ........ 455/404.1, 521, 418, 550.1; 718/1, 102, 718/104; 709/201, 202  
See application file for complete search history.

(56) References Cited

U.S. PATENT DOCUMENTS

| | | | | |
|---|---|---|---|---|
| 6,061,561 | A * | 5/2000 | Alanara et al. | 455/456.1 |
| 8,270,962 | B1 * | 9/2012 | Mauer et al. | 455/418 |
| 2003/0064761 | A1 * | 4/2003 | Nevermann | 455/572 |
| 2003/0224768 | A1 * | 12/2003 | Adjamah | 455/418 |
| 2004/0018831 | A1 * | 1/2004 | Majmundar et al. | 455/419 |
| 2004/0203876 | A1 * | 10/2004 | Drawert et al. | 455/456.1 |
| 2004/0261072 | A1 * | 12/2004 | Herle | 717/171 |
| 2006/0205445 | A1 * | 9/2006 | Sakaniwa et al. | 455/574 |
| 2007/0015499 | A1 * | 1/2007 | Vikse et al. | 455/419 |
| 2009/0024858 | A1 * | 1/2009 | Hijazi et al. | 713/323 |
| 2009/0165014 | A1 * | 6/2009 | Park | 718/105 |
| 2010/0031325 | A1 * | 2/2010 | Maigne et al. | 726/4 |
| 2010/0215153 | A1 * | 8/2010 | Ray et al. | 379/45 |

* cited by examiner

*Primary Examiner* — Olumide T Ajibade Akonai  
*Assistant Examiner* — Dung Hong

(57) ABSTRACT

A wireless communication device has first processing circuitry and second processing circuitry that are separate from one another. The wireless communication device transfers first wireless communications to a wireless network using the first processing circuitry. The wireless communication device identifies a reboot condition for the first processing circuitry and responsively provides a geographic location of the wireless communication device to the second processing circuitry and displays a user interface for communications using the second processing circuitry. The wireless communication device reboots the first processing circuitry while the user interface for communications is displayed. The wireless communication device transfers second wireless communications to the wireless network using the second processing circuitry while rebooting the first processing circuitry. The second wireless communications may comprise emergency communications including the geographic location of the wireless communication device.

20 Claims, 4 Drawing Sheets

WIRELESS COMMUNICATIONS DURING A WIRELESS COMMUNICATIONS DEVICE REBOOT

RELATED CASES

This patent application is a continuation of U.S. patent application Ser. No. 12/582,080 that was filed on Oct. 20, 2009 and is entitled "EMERGENCY CALLS ON A WIRELESS COMMUNICATION DEVICE DURING A DEVICE REBOOT." U.S. patent application Ser. No. 12/582,080 is hereby incorporated by reference into this patent application.

TECHNICAL FIELD

Aspects of the disclosure are related to the field of communications, and in particular, wireless communication devices.

TECHNICAL BACKGROUND

Wireless communication devices, such as cellular phones, are typically used to provide mobile and wireless communication services to customers across a wireless communication network. These wireless communication devices can allow a customer to access network services such as voice calls, data exchange, text messaging, Internet access, or other services. In many examples, emergency calls can also be placed on wireless communication devices to allow users to contact police, fire, or ambulance services over a 911 call. When certain emergency services are requested, a geographic location of the wireless communication device can be provided to the emergency service provider by the wireless communication network or wireless communication device.

The wireless communication devices typically include software to access the various services and allow a user to interact with the wireless communication device. This software typically includes firmware, an operating system, applications, or other software. However, the software of wireless communication devices often needs to be updated to correct bugs, add features, comply with changes to the wireless communication network, or for other reasons. In many examples of software updates, a reboot of a wireless communication device is required. Unfortunately, the wireless communication device, when being rebooted, can not provide a user with access to the services of the wireless communication network. This can be especially troublesome when access to emergency services is unavailable during the reboot of the wireless communication device.

OVERVIEW

A wireless communication device has first processing circuitry and second processing circuitry that are separate from one another. The wireless communication device transfers first wireless communications to a wireless network using the first processing circuitry. The wireless communication device identifies a reboot condition for the first processing circuitry and responsively provides a geographic location of the wireless communication device to the second processing circuitry and displays a user interface for communications using the second processing circuitry. The wireless communication device reboots the first processing circuitry while the user interface for communications is displayed. The wireless communication device transfers second wireless communications to the wireless network using the second processing circuitry while rebooting the first processing circuitry. The second wireless communications may comprise emergency communications including the geographic location of the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
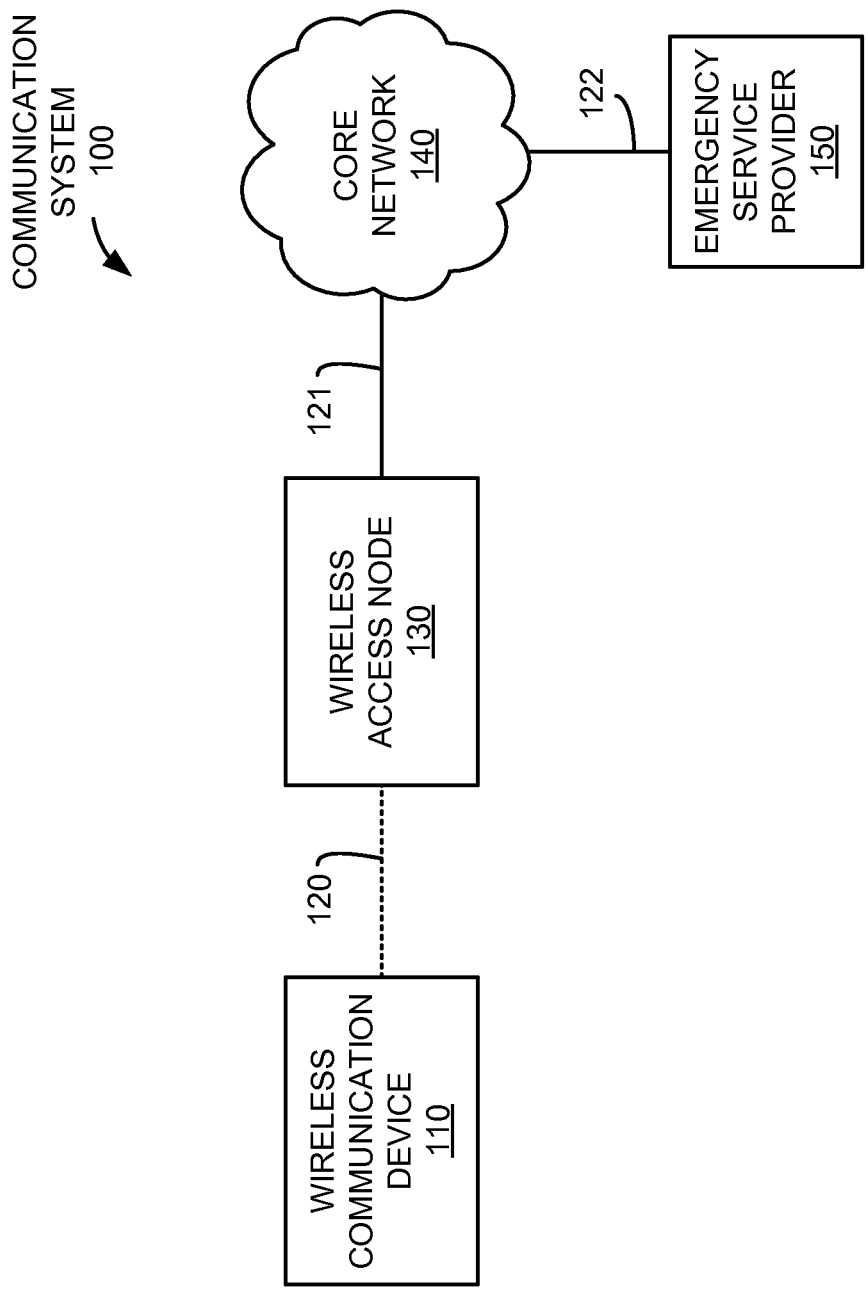
FIG. 1 is a system diagram illustrating a communication system.

FIG. 1 is a system diagram illustrating communication system 100. Communication system 100 includes wireless communication device 110, wireless access node 130, core network 140, and emergency service provider 150. Wireless communication device 110 and wireless access node 130 communicate over wireless link 120. Wireless access node 130 and core network 140 communicate over link 121. Core network 140 and emergency service provider 150 communicate over link 122. In FIG. 1, wireless access node 130 provides wireless access for wireless communication device 110. Wireless communication device 110 can receive communication services of core network 140, emergency service provider 150, application service providers, or other services, through wireless access node 130. In this example, wireless communication device 110 includes software to access the various services and allow a user to interact with wireless communication device 110. This software typically includes firmware, an operating system, applications, or other software. Wireless communication device 110 can also receive updates for the software.

Figure 2:
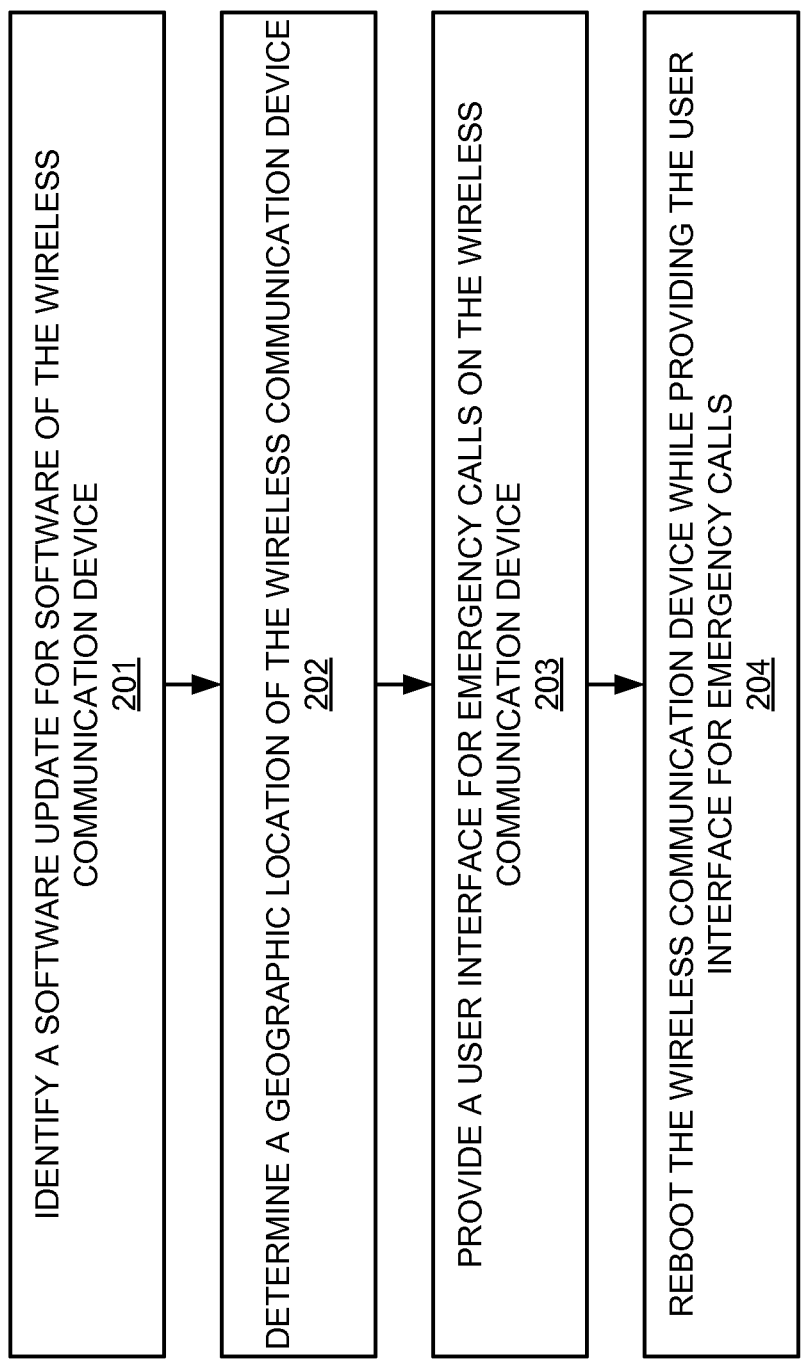
FIG. 2 is a flow diagram illustrating a method of operation of a wireless communication device.

FIG. 2 is a flow diagram illustrating a method of operation of wireless communication device 110. The operations in FIG. 2 are referenced herein parenthetically. In FIG. 2, wireless communication device 110 identifies (201) a software update for software of wireless communication device 110. In response to identifying the software update, wireless communication device 110 determines (202) a geographic location of wireless communication device 110. In some examples, the geographic location is determined by a global positioning system (GPS) receiver of wireless communication device 110, although it should be understood that other location methods could be used. Wireless communication device 110 provides (203) a user interface for emergency calls. Wireless communication device 110 reboots (204) the wireless communication device while providing the user interface for emergency calls during the reboot. It should be understood that the operations of FIG. 2 could occur in a different order than that discussed above or illustrated in FIG. 2.

Figure 3:
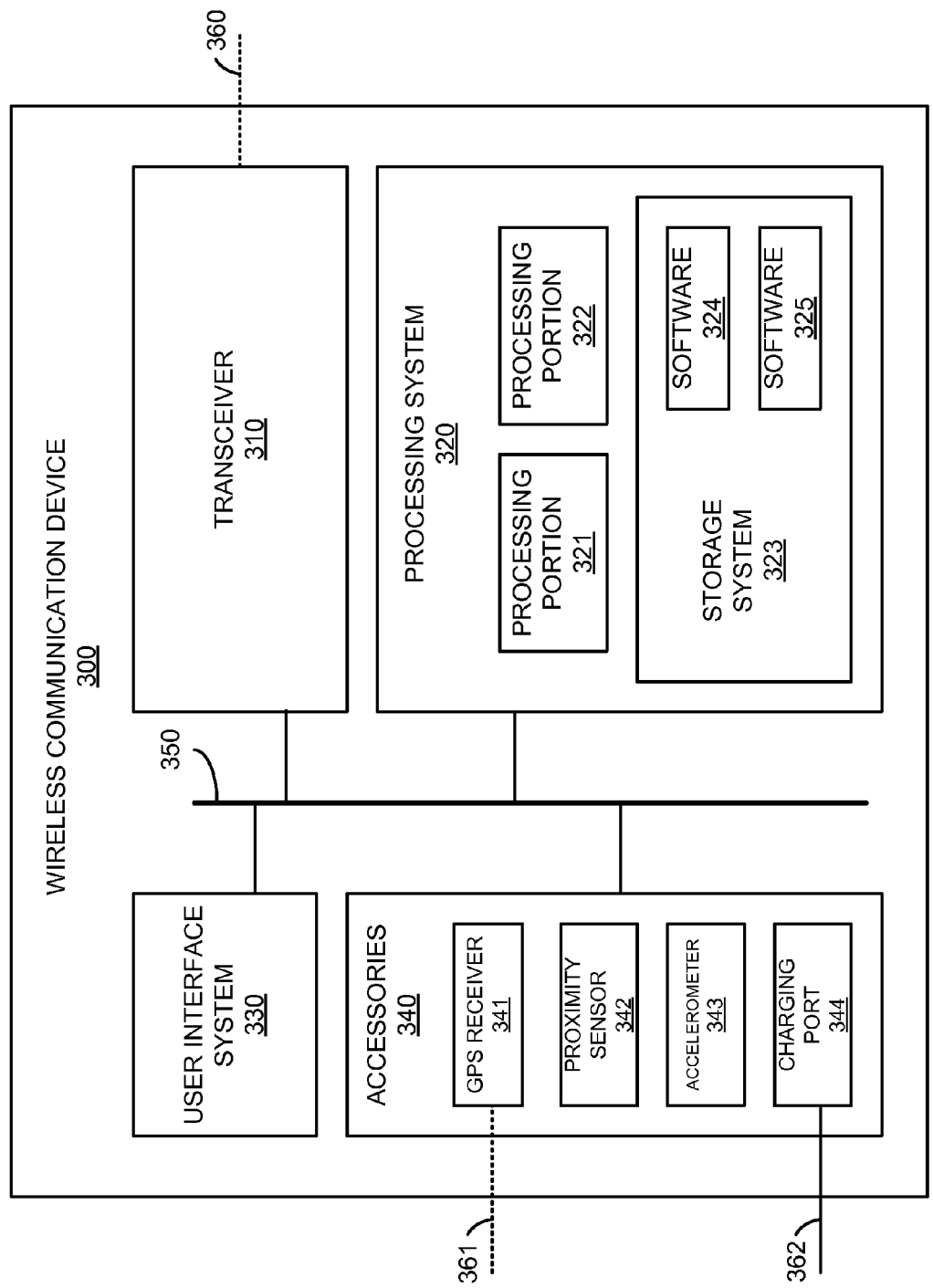
FIG. 3 is a block diagram illustrating a wireless communication device.

FIG. 3 is a block diagram illustrating wireless communication device 300, as an example of wireless communication device 110 found in FIG. 1, although wireless communication device 110 could use other configurations. Wireless communication device 300 includes transceiver 310, processing system 320, user interface system 330, and accessories 340. Transceiver 310, processing system 320, user interface system 330, and accessories 340 communicate over bus 350. Wireless communication device 300 may be distributed or consolidated among devices that together form elements 310, 320-325, 330, 340-344, and 350. Transceiver 310 comprises radio frequency (RF) communication circuitry and an antenna. Transceiver 310 could also include amplifiers, filters, modulators, and signal processing circuitry. In this example, transceiver 310 can exchange instructions and information with processing system 320. Transceiver 310 also communicates with a wireless access node, omitted for clarity, over wireless link 360.

Processing system 320 includes processing portions 321-322 and storage system 323. Processing portion 321 retrieves and executes software 324 from storage system 323. Processing portion 322 retrieves and executes software 325 from storage system 323. Processing portions 321-322 could each incorporate a computer microprocessor, logic circuit, or some other processing device, and may be distributed among multiple processing devices. In some examples, processing portions 321-322 are included within the same processing circuitry or processor, such as in a multi-core processor, while in other examples, processing portions 321-322 are each included on separate processing circuitry or processors. Processing system 320 or user interface system 330 could be located within the same equipment or circuitry in which transceiver 310 is located.

Storage system 323 could include computer-readable media such as disks, tapes, integrated circuits, servers, or some other memory device, and also may be distributed among multiple memory devices. In some examples, software 324-325 are each stored on a different computer-readable medium of storage system 323, while in other examples software 324-325 are each located on the same computer-readable medium, but in separate logical locations. Software 324-325 may each include an operating system, logs, utilities, drivers, networking software, and other software typically loaded onto a computer system. Software 324-325 could each contain an application program, firmware, or some other form of computer-readable processing instructions. When executed by processing system 320, software 324-325 directs wireless communication device 300 to operate as described herein.

User interface system 330 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface system 330 also includes equipment to communicate information to a user of wireless communication device 300. Examples of the equipment to communicate information to the user could include indicator lights, lamps, light-emitting diodes, displays, haptic feedback devices, audible signal transducers, speakers, buzzers, alarms, vibration devices, or other indicator equipment, including combinations thereof.

Accessories 340 include global positioning system (GPS) receiver 341, proximity sensor 342, accelerometer 343, and charging port 344. GPS receiver 341 incorporates circuitry and receiver equipment to detect global positioning signaling over wireless link 361 from GPS satellite transmitters to determine a geographic position of wireless communication device 300. Proximity sensor 342 includes circuitry and sensors to detect whether wireless communication device 300 is proximately located to a human body, and could include capacitive sensors, heat sensors, resistivity sensors, or other equipment. Accelerometer 343 includes circuitry and sensor equipment to detect acceleration of wireless communication device 300, and could include solid-state acceleration sensors, magnetic sensors, amplifiers, comparators, or other circuitry. Charging port 344 includes circuitry and equipment to provide power to wireless communication device 300 and to charge a battery of wireless communication device 300 if wireless communication device is a portable device. Charging port 344 could receive power over link 362 from a wall source, AC power source, car adapter, or other power source. Charging port 344 may provide power over bus 350 in some examples, while in other examples charging port 344 transfers indicators of charging status over bus 350.

Bus 350 comprises a physical, logical, or virtual communication link, capable of communicating data, control signals, communications, and power, along with other information and signals. In some examples, bus 350 is encapsulated within the elements of transceiver 310, processing system 320, user interface system 330, or accessories 340, and may be a software or logical link. In other examples, bus 350 each use various communication media, such as air, space, metal, optical fiber, or some other signal propagation path, including combinations thereof. Bus 350 could be direct links or might include various equipment, intermediate components, systems, and networks. Wireless link 360 could use various protocols or communication formats as described herein for wireless link 120, including combinations, variations, or improvements thereof.

Figure 4:
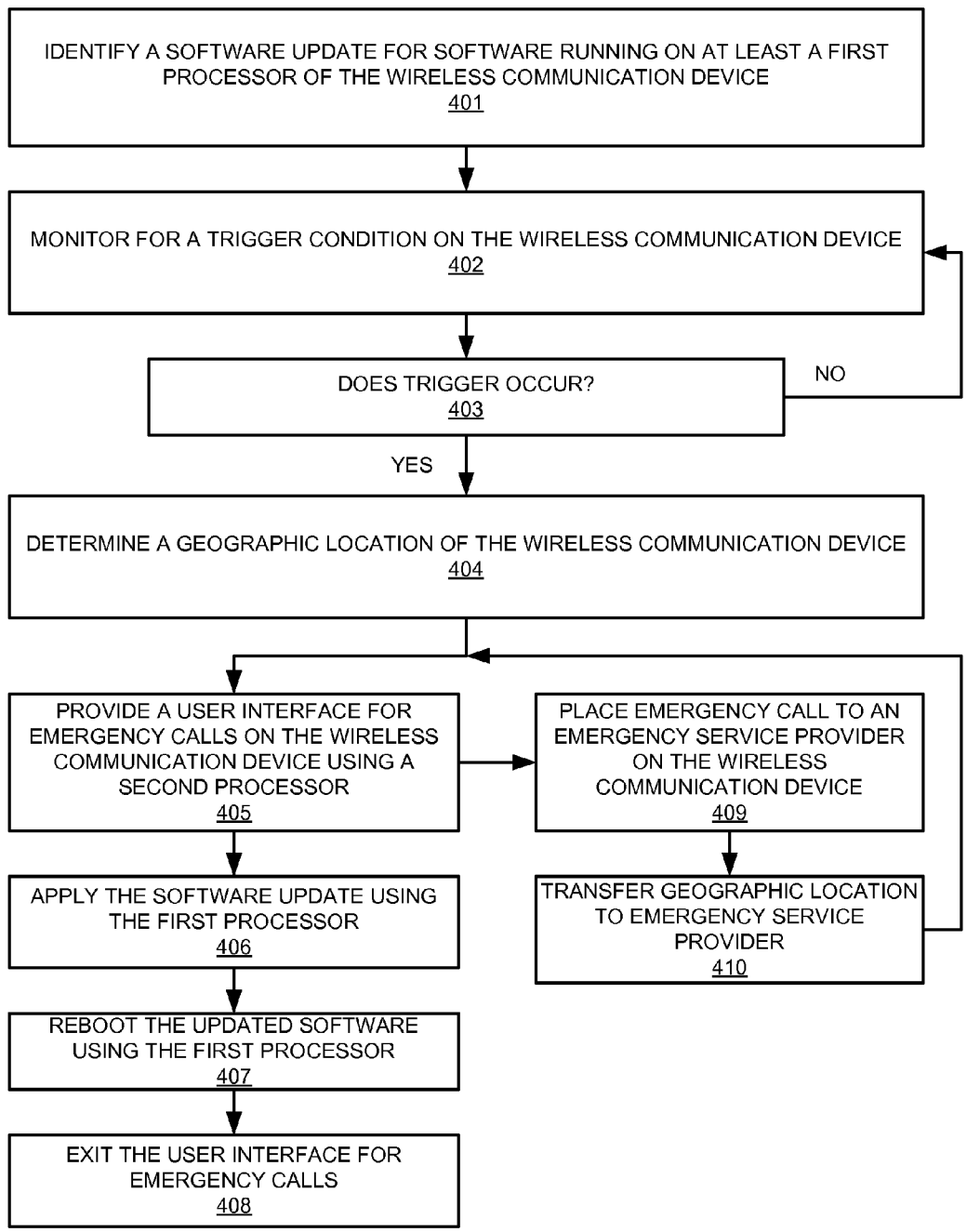
FIG. 4 is a flow diagram illustrating a method of operation of a wireless communication device.

FIG. 4 is a flow diagram illustrating a method of operation of wireless communication device 300. The operations in FIG. 4 are referenced herein parenthetically. In FIG. 4, wireless communication device 300 identifies (401) a software update for software running on at least a first processor of wireless communication device 300. In this example, the software is running on processing portion 321 of processing system 320, where the software is stored as software 324 on storage system 323. Wireless communication device 300 could identify a software update by receiving a notice of a software update over wireless link 360, by checking for a software update on a file server associated with a wireless communication network, or by other methods. The software update could include further software that includes a full replacement for the software to be updated, or could be a patch or portion of the software to be updated. In some examples, the software is a user or system application stored on storage system 323, while in other examples, the software is an operating system software for wireless communication device 300. Also in this example, the software update requires a reboot of wireless communication device 300 to complete the software update process. This reboot could include a restart of the hardware involved in running the software, or a restart of the software itself after the software update has been applied.

Wireless communication device 300 monitors (402) for a trigger condition. The trigger condition monitored by wireless communication device 300 could include many different triggers or keys. For example, these triggers could include monitoring proximity sensor 342 of wireless communication device 300, where proximity sensor 342 indicates when wireless communication device 300 is proximately located to a human body, such as a face or head. Proximity sensors can be used in other examples to disable a touch screen or keypad of wireless communication device 300 when nearby the ear or face of a user of wireless communication device 300. In other examples, an activity level of wireless communication device 300 is monitored to determine when wireless communication device 300 is not in use by a user, or when in an idle or inactive state, such as when no call or data session is active. In further examples, charging port 344 could be monitored to detect when a battery of wireless communication device 300 is being charged or when wireless communication device 300 is connected to an external power source, such as wall power. In yet further examples, accelerometer 343 of wireless communication device 300 could be monitored to determine when wireless communication device 300 is not in motion, or has not been in motion for a predetermined amount of time, which could indicate that wireless communication device 300 is not in use by a user. Other examples of a trigger condition can include a time of day, day of the week or month, a percentage of activity of wireless communication device 300, a processor utilization of wireless communication device 300, if a speakerphone of wireless communication device 300 is in use, if a game is being played on wireless communication device 300, a geographic location of wireless communication device 300—such as when wireless communication device 300 is at a home location, or other trigger conditions. Additionally, a past usage profile could be determined for wireless communication device 300, to possibly determine when a likely time of non-use is for wireless communication device 300.

If the trigger condition does not occur (403), then wireless communication device 300 continues to monitor for the trigger condition. However, if the trigger condition occurs (403), then wireless communication device 300 determines a geographic location of wireless communication device 300. The geographic location could be determined by global positioning system (GPS) receiver 341 of wireless communication device 300 in some examples. In other examples, a base station or sector used by wireless communication device 300 could be identified. In yet further examples, position determining equipment (PDE) of a wireless communication network associated with wireless communication device 300 could be used to determine a geographic location via triangulation or similar methods. The geographic location could correspond to geographic coordinates, an associated base station or sector, or to other indicators of geographic location. Wireless communication device 300 then stores the geographic location in storage system 323 for later use. In some examples, wireless communication device 300 transfers the geographic location over wireless link 360 to a storage device or storage system in a wireless communication network associated with wireless communication device 300.

Wireless communication device 300 also provides (405) a user interface for emergency calls using a second processor of wireless communication device 300. It should be understood that the user interface could be provided simultaneously with determining the geographic location, or both actions could occur sequentially. In this example, the user interface for emergency calls is provided using processing portion 322 of processing system 320, and software associated with the user interface could be software 325 on storage system 323. Additionally, the user interface for emergency calls can be provided to a user of wireless communication system 300 by user interface system 330. User interface system 330 could include a display and a key or button, and used to present the user interface for emergency calls to a user.

The user interface for emergency calls could include a second instance of the software to be updated, such as in examples where the software to be updated is operating system software. In other examples, the user interface for emergency calls is a limited functionality user interface which allows a user of wireless communication device 300 to only place emergency calls on wireless communication device 300. In examples of limited functionality user interfaces, a thin client could be provided which has a key or button for placing emergency calls. The full functionality of user interface system 330 could be reduced while the user interface for emergency calls is provided. The reduction in functionality would typically be commensurate with the level of functionality provided to a user by the user interface for emergency calls. In some examples, the thin client is operating system software of a different operating system type than of the software to be updated. For example, the software to be updated could be Microsoft Windows®-based operating system software, while the thin client could be based upon Linux® operating system software. In other examples, such as when wireless communication device 300 uses voice-over IP (VoIP) technology to place calls, a VoIP application could be provided with the user interface for emergency calls. Additionally, the user interface for emergency calls could disable incoming calls to wireless communication device 300, or allow a user to cancel an active software update process or reboot.

Wireless communication device 300 applies (406) the software update using the first processor. In this example, the software update is applied using processing portion 321 of processing system 320, where the software is stored as software 324 on storage system 323. In examples of a software patch to the software, the patch is applied to a portion of software 324, whereas in examples of a complete replacement of the software, then the entirety of software 324 could be replaced. In some examples, applying a software update include updating and recompiling software of wireless communication device 300 from source code. Since the software update is applied using processing portion 321 and the user interface for emergency calls is provided using processing portion 322, the software update can be applied in the background and simultaneous to the user interface for emergency calls. Also, since in this example, the software update requires a reboot of wireless communication device 300, whether a hardware or software portion thereof, wireless communication device 300 reboots (407) updated software 324 using the first processor, or processing portion 321. In this manner, the entirety of wireless communication device 300 need not be rebooted, merely a portion related to applying a software update to software 324 using processing portion 321.

The user interface for emergency calls is provided on wireless communication device 300 while the software update is applied as well as during the reboot. Thus, as shown in FIG. 4, a user of wireless communication device 300 can place (409) an emergency call to an emergency service provider using the user interface for emergency calls while the software update is applied as well as during a reboot. In some examples, the software update could be applied to the software during normal operation of wireless communication device 300 without providing a user interface for emergency calls, such as when done in the background on a multitasking operating system. The user interface for emergency calls could only be provided during a reboot in some examples. In other examples, the user interface for emergency calls is provided during both the application of the software update and the reboot. User interface system 330 may include circuitry or equipment to multiplex usage of a single display and keypad of wireless communication device 300. User interface system 330 could then exchange display information and user input with the active processing portion of wireless communication device 300.

An emergency service provider can include services provided to a user of wireless communication device 300 for medical, law enforcement, fire, or other purposes. For example, in FIG. 1, emergency service provider 150 could be contacted through the user interface for emergency calls of wireless communication device 300 over wireless link 360, although other examples could be used. In some examples, the emergency call for emergency services to an emergency service provider includes where the user of wireless communication device 300 places a call using an emergency number, such as a 911 call. In further examples, the call for emergency services to an emergency services provider includes where the user of wireless communication device 300 requests an emergency service over a text message, email, web page, user application, VoIP connection, or other communication service type provided on the user interface for emergency calls of wireless communication device 300.

In examples of conventional circuit-switched telephones, the location of a user is typically associated with a wired connection to a home or business. However, with wireless communication devices, this location can vary, especially if the wireless communication device is mobile. Since, in this example, wireless communication device 300 incorporates a global positioning system (GPS) receiver, location information obtained via GPS could be transferred (410) to an emergency service provider to assist in determining a location. However, in typical examples, the GPS receiver is not available during a software update or reboot of wireless communication device 300. Therefore, the geographic location determined in operation 404, as discussed above, is transferred to the emergency service provider. In this manner, the geographic location of wireless communication device 300 is pre-stored or cached prior to application of the software update or reboot. The user interface for emergency calls would have access to the pre-stored geographic location, such as stored in storage system 323, and make this geographic location available to the desired emergency service provider if an emergency call is placed using the user interface for emergency calls.

Additionally, the user interface for emergency calls could incorporate features to provide an updated geographic location to the emergency service provider. If a long period of time has elapsed since the determination of the original geographic location of wireless communication device 300 in operation 404, the pre-stored geographic location may be invalid or inaccurate. For example, when wireless communication device 330 is in motion, such as in a car, the geographic location may be inaccurate if a sufficient period of time has elapsed. Therefore, wireless communication device 300 could incorporate accelerometer 343 to update the pre-stored geographic location with additional data to determine an updated geographic location. In further examples, the user interface for emergency calls could make available the features of a GPS receiver of wireless communication device 300. These GPS features could also be loaded and processed on the second processor, or processing portion 322 of processing system 320 when the user interface for emergency calls is provided.

Once software 324 has been updated and rebooted, wireless communication device 300 then exits (408) the user interface for emergency calls, and activates the normal operating software. In this example, since the user interface for emergency calls is provided using software 325 on processing portion 322 and software 324 is updated and rebooted using processing portion 321, the user interface for emergency calls can be unloaded or inactivated on processing portion 322. In further examples, the resources related to processing portion 322 can be released for use by software 324, thus allowing software 324 to utilize the entirety of processing system 320 for normal user operations.

Advantageously, a software update for software of wireless communication device 300 can be applied or wireless communication device 300 can be rebooted while allowing a user to place emergency calls during the software update or reboot process. In this manner, little or no interruption to the emergency services capability of wireless communication device 300 would be experienced. Furthermore, trigger conditions can be monitored to determine when to initiate the software update process or reboot of wireless communication device 300. The trigger conditions can allow for a convenient time or location for providing the user interface for emergency calls, for initiating a software update, or reboot, so as to minimize interruption or any reduction in full functionality of wireless communication device 300 for a user.

Referring back to FIG. 1, wireless communication device 110 comprises radio frequency (RF) communication circuitry and an antenna. The RF communication circuitry typically includes amplifiers, filters, modulators, and signal processing circuitry. In many examples, wireless communication device 110 includes circuitry and equipment to register for wireless communication services with wireless access node 130 over wireless link 120. Wireless communication device 110 may also include user interface systems, memory devices, computer-readable storage mediums, software, processing circuitry, or some other communication components. Wireless communication device 110 may be a telephone, mobile wireless telephone, computer, e-book, mobile Internet appliance, wireless network interface card, media player, game console, or some other wireless communication apparatus, including combinations thereof.

Wireless access node 130 comprises RF communication and control circuitry and an antenna. The RF communication circuitry typically includes amplifiers, filters, RF modulators, and signal processing circuitry. In many examples, wireless access node 130 includes equipment to provide wireless communication services to wireless communication device 110, and route communications between core network 140 and wireless communication device 110. Wireless access node 130 may also comprise a router, server, memory device, software, processing circuitry, cabling, power supply, network communication interface, physical structural support, or some other communication apparatus. Wireless access node 130 could be a base station, base transceiver station, Internet access node, telephony service node, wireless data access point, or some other wireless communication system, including combinations thereof. In typical examples, wireless access node 130 has a limited geographic coverage area over which it can provide communication services to wireless communication devices.

Core network 140 comprises the core network of a wireless communications provider, and could include routers, gateways, telecommunication switches, processing systems, or other communications equipment and systems for providing communication and data services. In the example shown in FIG. 1, core network 140 routes communications between emergency service provider 150 and wireless communication device 110. Core network 140 may also comprise optical networks, asynchronous transfer mode (ATM) networks, packet networks, metropolitan-area networks (MAN), or other network topologies, equipment, or systems, including combinations thereof. In some examples, core network 140 includes further wireless access nodes and associated equipment for providing communication services to many wireless communication devices across a geographic region.

Emergency service provider 150 could include services available to a user of wireless communication device 110 for medical, law enforcement, fire, or other purposes. Emergency service provider 150 could also include a dispatch system for handling requests for emergency service, and is typically operated by government departments or agencies, civilian service providers, medical providers, first-response providers, or other third-party entities. Since, in many examples, requests for emergency services could arrive over an emergency number, such as a 911 call, or by other methods, such as over a text message, email, web page, user application, or other communication service type, emergency service provider 150 includes equipment or systems to handle the various communication service types and arrival methods. Emergency service provider 150 also includes equipment or systems to receive location information associated with the emergency requests Wireless link 120 uses the air or space as the transport media. Wireless link 120 may use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication links 121-122 each use metal, glass, optical, air, space, or some other material as the transport media. Communication links 121-122 could each use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof. In some examples, communication link 122 includes a circuit-switched voice link between core network 140 and emergency service provider 150.

Links 120-122 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication links 121-122 could each be direct links or may include intermediate networks, systems, or devices. In many examples, the portion of wireless link 120 as transmitted by wireless communication device 110 is referred to an uplink or reverse link of the wireless link, while the portion as transmitted by wireless access node 130 is referred to as a downlink or forward link of the wireless link.

FIGS. 1-4 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device having first processing circuitry and second processing circuitry, the method comprising:

transferring first wireless communications to a wireless network using the first processing circuitry;
identifying a reboot condition for the first processing circuitry, and in response, providing a geographic location of the wireless communication device using geographic position equipment of the wireless communication device to second processing circuitry, and displaying a user interface for communications on the wireless communication device using the second processing circuitry;
rebooting the first processing circuitry while the user interface for communications is displayed, wherein the geographic position equipment of the wireless communication device is unavailable during reboot; and
transferring second wireless communications comprising the geographic location of the wireless communication device to the wireless network using the second processing circuitry while rebooting the first processing circuitry, wherein the second processing circuitry is separate from the first processing circuitry.

2. The method of claim 1 wherein transferring the second wireless communications comprises transferring emergency communications including the geographic location of the wireless communication device.

3. The method of claim 1 wherein displaying the user interface for communications comprises displaying an emergency communication button.

4. The method of claim 1 wherein:
identifying the reboot condition for the first processing circuitry comprises identifying a software update for the first processing circuitry; and
rebooting the first processing circuitry comprises implementing the software update for the first processing circuitry.

5. The method of claim 1 wherein:
identifying the reboot condition for the first processing circuitry comprises identifying a software operating system update for the first processing circuitry; and
rebooting the first processing circuitry comprises implementing the software operating system update for the first processing circuitry.

6. The method of claim 1 wherein:
rebooting the first processing circuitry comprises updating a first software operating system for the first processing circuitry;
displaying the user interface and transferring the second wireless communications using the second processing circuitry comprises using a second software operating system that is different from the first software operating system.

7. The method of claim 1 wherein the first processing circuitry comprises a first microprocessor and the second processing circuitry comprises a second microprocessor that is separate from the first microprocessor.

8. The method of claim 1 wherein identifying the reboot condition for the first processing circuitry comprises identifying when the wireless communication device is not in proximity to a human body.

9. The method of claim 1 wherein identifying the reboot condition for the first processing circuitry comprises identifying when the wireless communication device is charging.

10. The method of claim 1 wherein identifying the reboot condition for the first processing circuitry comprises identifying when the wireless communication device is not in motion.

11. A wireless communication device comprising:
a processing system having first processing circuitry and second processing circuitry that is separate from the first processing circuitry;
a graphic display configured to display a user interface for communications;
the processing system configured to transfer first wireless communications to a wireless network using the first processing circuitry and to identify a reboot condition for the first processing circuitry;
the processing system configured to, in response to identifying the reboot condition, provide a geographic location of the wireless communication device using geographic position equipment of the wireless communication device to the second processing circuitry and to direct the graphical display to display the user interface for communications using the second processing circuitry; and
the processing system configured to reboot the first processing circuitry while the user interface for communications is displayed, wherein the geographic position equipment of the wireless communication device is unavailable during reboot; and
the processing system configured to transfer second wireless communications comprising the geographic location of the wireless communication device to the wireless network using the second processing circuitry while rebooting the first processing circuitry.

12. The wireless communication device of claim 11 wherein the processing system is configured to direct the transfer of emergency communications including the geographic location of the wireless communication device using the using the second processing circuitry while rebooting the first processing circuitry.

13. The wireless communication device of claim 11 wherein the user interface for communications comprises an emergency communication button on the graphic display.

14. The wireless communication device of claim 11 wherein the processing system is configured to identify the reboot condition by identifying a software update the first processing circuitry and to implement the software update for the first processing circuitry during the reboot.

15. The wireless communication device of claim 11 wherein the processing system is configured to identify the reboot condition by identifying a software operating system update the first processing circuitry and to implement the software operating system update for the first processing circuitry during the reboot.

16. The wireless communication device of claim 11 wherein the processing system is configured to identify the reboot condition by identifying an update to a first software operating system for the first processing circuitry and wherein the second processing circuitry uses a second software operating system that is different from the first software operating system.

17. The wireless communication device of claim 11 wherein the first processing circuitry comprises a first microprocessor and the second processing circuitry comprises a second microprocessor that is separate from the first microprocessor.

18. The wireless communication device of claim 11 wherein the processing system is configured to identify the reboot condition by identifying when the wireless communication device is not in proximity to a human body.

19. The wireless communication device of claim 11 wherein the processing system is configured to identify the reboot condition by identifying when the wireless communication device is charging.

20. The wireless communication device of claim 11 wherein the processing system is configured to identify the reboot condition by identifying when the wireless communication device is not in motion.

* * * * *